United States Patent
Ohashi

(10) Patent No.: US 11,176,748 B2
(45) Date of Patent: Nov. 16, 2021

(54) IMAGE PROCESSING APPARATUS, IMAGE PROCESSING METHOD, AND PROGRAM

(71) Applicant: SONY INTERACTIVE ENTERTAINMENT INC., Tokyo (JP)

(72) Inventor: Yoshinori Ohashi, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 16/764,364

(22) PCT Filed: Sep. 4, 2018

(86) PCT No.: PCT/JP2018/032773
§ 371 (c)(1),
(2) Date: May 14, 2020

(87) PCT Pub. No.: WO2019/123729
PCT Pub. Date: Jun. 27, 2019

(65) Prior Publication Data
US 2020/0279438 A1    Sep. 3, 2020

(30) Foreign Application Priority Data

Dec. 19, 2017 (JP) .............................. JP2017-242824

(51) Int. Cl.
*G06T 19/00* (2011.01)
*H04N 13/111* (2018.01)

(52) U.S. Cl.
CPC .......... *G06T 19/006* (2013.01); *H04N 13/111* (2018.05); *G06T 2210/21* (2013.01)

(58) Field of Classification Search
CPC ............. G06T 19/006; G06T 2210/21; H04N 13/111; H04N 13/128; H04N 2013/0081;
(Continued)

(56) References Cited

U.S. PATENT DOCUMENTS

2002/0158873 A1* 10/2002 Williamson ............ G06T 17/00
345/427
2015/0078621 A1* 3/2015 Choi ...................... G06F 3/011
382/103
(Continued)

FOREIGN PATENT DOCUMENTS

JP  2012-155655 A  8/2012
JP  2016-004493 A  1/2016

OTHER PUBLICATIONS

International Preliminary Report on Patentability dated Jul. 2, 2020, from International Application No. PCT/JP2018/032773, 11 sheets.
(Continued)

*Primary Examiner* — Tapas Mazumder
(74) *Attorney, Agent, or Firm* — Katten Muchin Rosenman LLP

(57) ABSTRACT

A virtual space configuration unit 23 detects, on the basis of depth information of an image of a real space around a user, a position of an object in the real space and arrange a virtual body at a position in a virtual space corresponding to the detected position of the object to configure information of the virtual space. An image generation unit 25 generates an image of the virtual space configured by the virtual space configuration unit 23. A depth comparison unit 22 compares the depth information of the image of the real space and depth information of the image of the virtual space to decide an unknown depth region. The image generation unit 25 displays information indicative of presence of an unknown object in the unknown depth region of the image of the virtual space.

8 Claims, 10 Drawing Sheets

(58) Field of Classification Search
CPC .......... H04N 2013/0092; H04N 13/344; A63F 13/577; A63F 13/65; A63F 13/213; G06F 3/012; G06F 3/017; G06F 3/011
See application file for complete search history.

(56) References Cited

U.S. PATENT DOCUMENTS

2015/0243079 A1    8/2015  Cho et al.
2017/0365100 A1* 12/2017  Walton ............... G06K 9/00624

OTHER PUBLICATIONS

International Search Report and Written Opinion dated Nov. 27, 2018, from International Application No. PCT/JP2018/032773, 6 sheets.

* cited by examiner

FIG.3
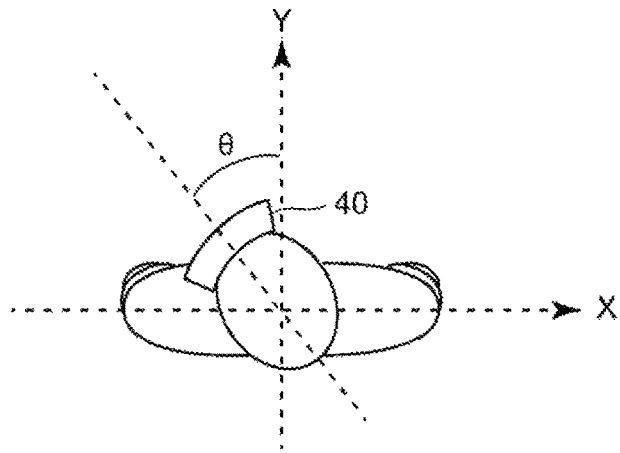
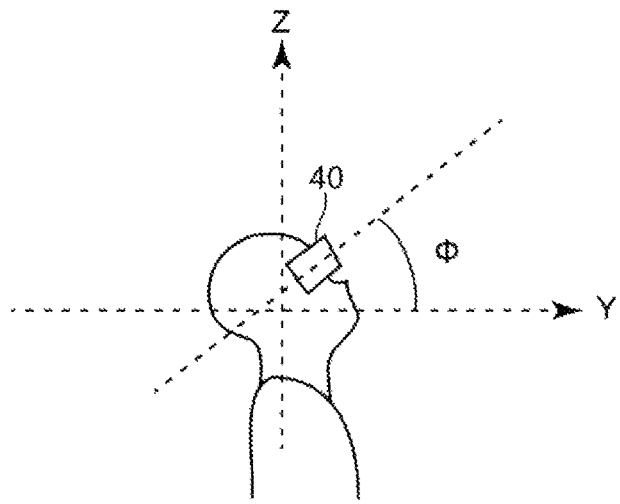
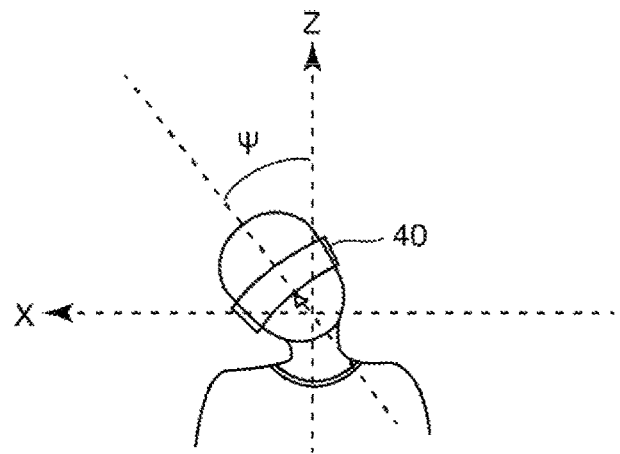

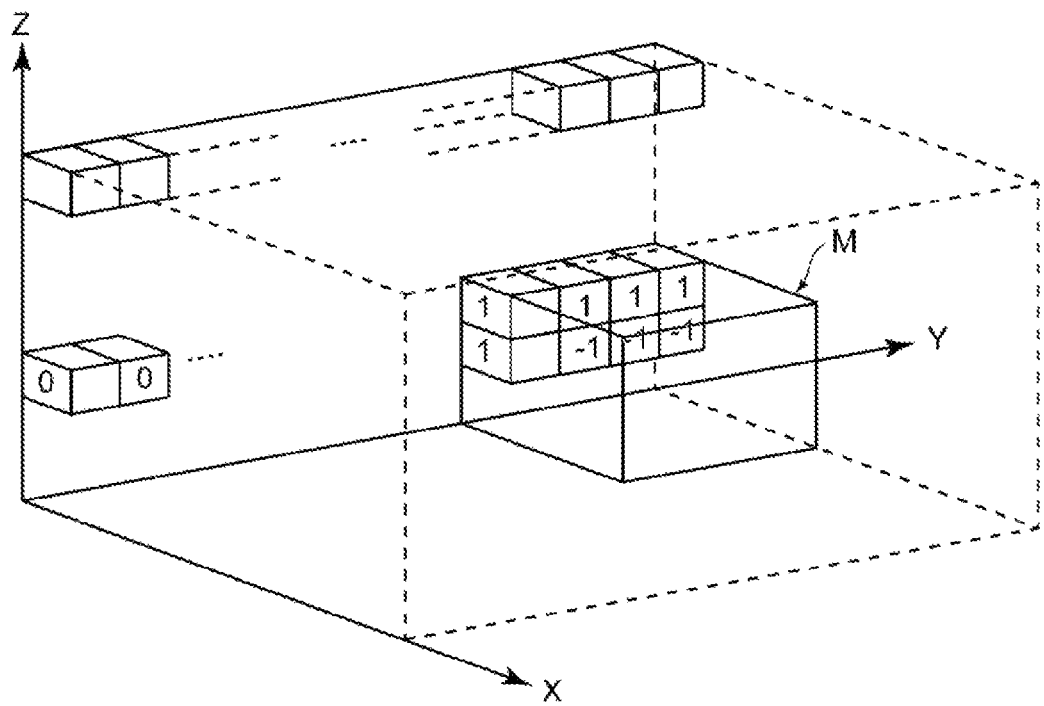

IMAGE PROCESSING APPARATUS, IMAGE PROCESSING METHOD, AND PROGRAM

TECHNICAL FIELD

This invention relates to an image processing technology for generating a video of augmented reality.

BACKGROUND ART

A user wears a head-mounted display connected to a game machine on the head of the user and plays a game by operating a controller or the like while viewing a screen image displayed on the head-mounted display. When wearing the head-mounted display, since the user does not view anything other than a video displayed on the head-mounted display, the immersion into a video world is increased, and there is an effect that the entertainment of the game is enhanced more. Further, by displaying a video of virtual reality (VR) on the head-mounted display, and displaying a virtual space such that the user wearing the head-mounted display can take a 360-degree view when turning the head, the immersion into the video is further increased, and also operability of an application such as the game is enhanced.

Although a user wearing a non-transmission type head-mounted display cannot directly view an outside world, a video transmission (video see-through) type head-mounted display is also available by which an outside video can be captured by a camera incorporated in the head-mounted display and displayed on a display panel. In the video transmission type head-mounted display, also it is possible to generate and display a video of augmented reality (AR) by superimposing an object of the virtual world generated by computer graphics (CG) on a video of the outside world captured by the camera. The video of the augmented reality is different from the virtual reality separated from the real world in that the real world is augmented with a virtual object, and the user can experience the virtual world while being aware of the connection with the real world.

SUMMARY

Technical Problem

In a case where a video of the augmented reality in which a body existing in the real world is replaced with a virtual object is displayed on a head-mounted display, if a dynamic body enters the real space later, this is not displayed in the virtual space. The user cannot visually recognize the body having appeared suddenly and sometimes feels uncomfortable through a touch in error with the body.

The present invention has been made in view of such a problem as described above, and the object of the present invention resides in provision of an image processing technology that can provide a video of augmented reality free from an uncomfortable feeling in an environment in which there is a dynamic change.

Solution to Problem

In order to solve the problem described above, an image processing apparatus of a certain aspect of the present invention includes: a virtual space configuration unit configured to detect, on the basis of depth information of an image of a real space around a user, a position of an object in the real space and arrange a virtual body at a position in a virtual space corresponding to the detected position of the object to configure information of the virtual space; an image generation unit configured to generate an image of the virtual space configured by the virtual space configuration unit; and a depth comparison unit configured to compare the depth information of the image of the real space and depth information of the image of the virtual space to decide an unknown depth region. The image generation unit displays information indicative of presence of an unknown object in the unknown depth region of the image of the virtual space.

Another aspect of the present invention is an image processing method. This method includes: a virtual space configuration step of detecting, on the basis of depth information of an image of a real space around a user, a position of an object in the real space and arrange a virtual body at a position in a virtual space corresponding to the detected position of the object to configure information of the virtual space; an image generation step of generating an image of the virtual space configured by the virtual space configuration step; and a depth comparison step of comparing the depth information of the image of the real space and depth information of the image of the virtual space to decide an unknown depth region. The image generation step displays information indicative of presence of an unknown object in the unknown depth region of the image of the virtual space.

It is to be noted that conversion of optional combinations of the aforementioned constituent elements and expressions of the present invention among a method, an apparatus, a system, a computer program, a data structure, a recording medium, and so forth is also effective an aspect of the present invention.

Advantageous Effect of Invention

According to the present invention, a video of augmented reality free from an uncomfortable feeling in an environment in which there is a dynamic change can be provided.

BRIEF DESCRIPTION OF DRAWINGS

FIG. 3 is an explanatory diagram illustrating an example of information regarding inclination of the head used by the image processing apparatus according to the embodiment of the present invention.

FIG. 4 is an explanatory diagram illustrating an example of a body buffer generated by the image processing apparatus according to the embodiment of the present invention.

FIG. 5 is an explanatory diagram illustrating a projection image of the body buffer generated by the image processing apparatus according to the embodiment of the present invention.

DESCRIPTION OF EMBODIMENT

Figure 1:
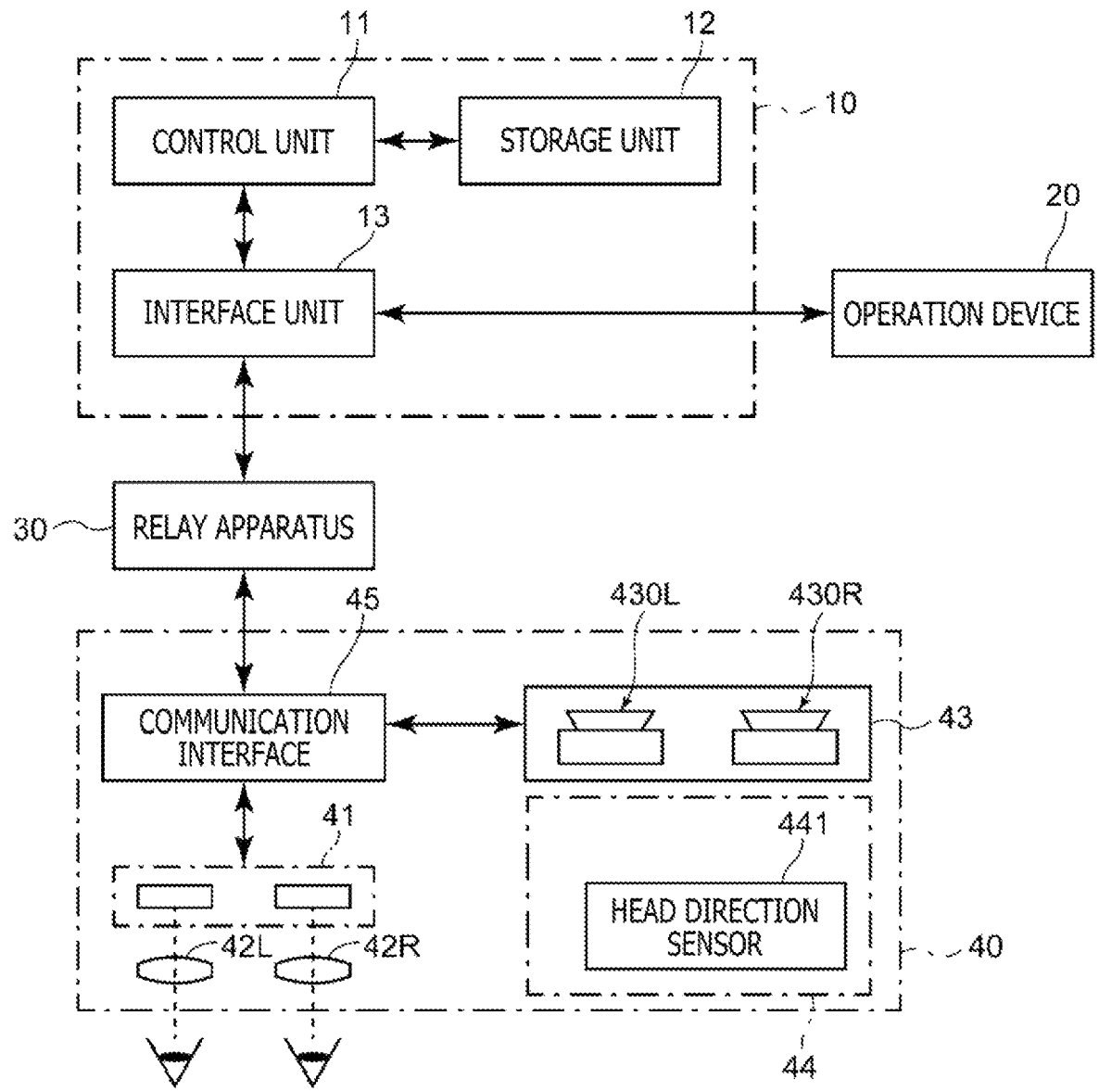
FIG. 1 is a constitutional block diagram illustrating an example of an image processing system including an image processing apparatus according to an embodiment of the present invention.

An embodiment of the present invention is described with reference to the drawings. As illustrated in FIG. 1, an image processing system 1, which includes an image processing apparatus 10 according to the embodiment of the present invention, includes the image processing apparatus 10, an operation device 20, a relay apparatus 30, and a display apparatus 40.

The image processing apparatus 10 is an apparatus supplying images to be displayed by the display apparatus 40. For example, the image processing apparatus 10 is a home video game machine, a portable video game player, a personal computer, a smartphone, a tablet, or the like. As illustrated in FIG. 1, the image processing apparatus 10 includes a control unit 11, a storage unit 12, and an interface unit 13.

The control unit 11 is a program control device such as a central processing unit (CPU), and executes a program stored in the storage unit 12. In the present embodiment, the control unit 11 acquires information regarding a real space around a user wearing the display apparatus 40, detects a position of each object in the real space based on the acquired information regarding the real space, and configures information regarding a virtual space by disposing a virtual body (referred to as a virtual object) at a position in the virtual space corresponding to the position of each detected object.

Moreover, the control unit 11 generates images in predetermined visual fields from positions of rendering cameras (virtual cameras used in performing rendering of the virtual space) separately set in the configured virtual space, and outputs the generated images to the display apparatus 40. Regarding the positions of the rendering cameras, two positions (one is a position corresponding to the left eye of the user, and the other is a position corresponding to the right eye thereof) may be set, and the control unit 11 may generate mages (an image for the left eye and an image for the right eye) of the virtual space in the visual fields from the respective positions and may output the pair of generated images as a stereovision image to the display apparatus 40. In the following example, the case where a stereovision image is generated is described.

In particular, in one example of the present embodiment, the control unit 11 sets a virtual three-dimensional space (virtual space) corresponding to the real space (hereinafter referred to as a target space) of a predetermined size around the user including a position of the user and a rear side of the user. For example, the predetermined size is a cuboid range of 10 m in width (a direction that is orthogonal to an initial eye direction of the user and is parallel to a floor surface), 10 m in depth (the initial eye direction of the user that is parallel to the floor surface), and 3 m in height. The control unit 11 refers to an image of the real space, and disposes a virtual object in this virtual space or applies a video effect in the virtual space.

The storage unit 12 includes at least one memory device such as a random access memory (RAM), and stores therein a program executed by the control unit 11. In addition, the storage unit 12 also operates as a work memory for the control unit 11, and stores therein data used by the control unit 11 in the course of executing a program. This program may be provided in a state of being stored in a computer readable and non-transitory record medium to be stored in the storage unit 12.

The interface unit 13 is an interface for data communication performed by the control unit 11 of the image processing apparatus 10 with the operation device 20 and the relay apparatus 30. The image processing apparatus 10 is connected with the operation device 20, the relay apparatus 30, or the like in a wired or wireless manner via the interface unit 13. As one example, the interface unit 13 may include a multimedia interface such as high-definition multimedia interface (HDMI; registered trademark) to send an image (a stereovision image) supplied by the image processing apparatus 10 and a sound to the relay apparatus 30. Additionally, the interface unit 13 may include a data communication interface such as universal serial bus (USB) to receive various types of information from the display apparatus 40 and send a control signal and the like via the relay apparatus 30. Moreover, the interface unit 13 may include a data communication interface such as USB to receive a signal representing contents of an operation input made by the user on the operation device 20.

The operation device 20 is, for example, a controller for a home video game machine. The operation device 20 is used by the user to perform various types of instruction operations on the image processing apparatus 10. The contents of the operation input made by the user on the operation device 20 is sent to the image processing apparatus 10 in a wired or wireless manner. Note that the operation device 20 may not be necessarily separated from the image processing apparatus 10, and may include an operation button, a touch panel, and the like that are disposed on a housing surface of the image processing apparatus 10. In one example of the present embodiment, the operation device 20 includes a "pause button" and the like for instructing a temporary stop of a game.

The relay apparatus 30 is connected with the display apparatus 40 in a wired or wireless manner. The relay apparatus 30 receives stereovision image data supplied from the image processing apparatus 10, and outputs a video signal according to the received data, to the display apparatus 40. At that time, the relay apparatus 30 may perform processing, for example, for correcting a distortion caused by optics of the display apparatus 40, on a video represented by the supplied stereovision image, as necessary, and may output a video signal representing the corrected video. Note that the video signal supplied from the relay apparatus 30 to the display apparatus 40 includes two video signals of a video signal for the left eye and a video signal for the right eye that are generated based on the stereovision image. In addition, the relay apparatus 30 relays various types of information such as sound data and control signals that are sent and received between the image processing apparatus 10 and the display apparatus 40, other than stereovision images and video signals.

The display apparatus 40 is a display device used by the user wearing the apparatus on the head thereof. The display apparatus 40 displays a video according to the video signal input from the relay apparatus 30 and allows the user to view the video. In the present embodiment, the display apparatus 40 displays a video corresponding to each of the eyes, in front of corresponding one of the right eye and the left eye of the user. As illustrated in FIG. 1, the display apparatus 40 includes a video display element 41, optical elements 42, a camera 43, a sensor 44, and a communication interface 45.

The video display element 41 is an organic electroluminescence (EL) display panel, a liquid crystal display panel, or the like. The video display element 41 displays a video according to the video signal supplied from the relay apparatus 30. The video display element 41 may be one display element that displays videos for the left eye and the right eye to be arranged in a row, or may include a pair of display elements that independently display the respective videos for the left eye and the right eye. Further, a display screen of a smartphone may be used as it is as the video display element 41. In addition, the display apparatus 40 may be an apparatus of a retinal irradiation type (retinal projection type) that directly projects a video on a retina of the user. In this case, the video display element 41 may include a laser that emits light, a micro electro mechanical systems (MEMS) mirror that scans the light, and the like.

The optical elements 42 are hologram, a prism, a half mirror, or the like, and are disposed in front of the eyes of the user. The optical elements 42 transmits or refracts light of a video displayed by the video display element 41 and causes the light to enter the eyes of the user. In particular, the optical elements 42 may include an optical element 42L for the left eye and an optical element 42R for the right eye. In this case, the video for the left eye displayed by the video display element 41 may enter the left eye of the user via the optical element 42L for the left eye. The video for the right eye may enter the right eye of the user via the optical element 42R for the right eye. Thereby, with the display apparatus 40 worn on the head, for example, the user can see, by the left eye, the video for the left eye based on the image for the left eye and can see, by the right eye, the video for the right eye based on the image for the right eye, these videos for the left eye and the right eye being generated by the image processing apparatus 10. Note that, in the present embodiment, the display apparatus 40 is a display apparatus of a non-transmission type with which the user cannot view the state of the outside world.

Herein, an image generated by the image processing apparatus 10 is a stereovision image. However, if the image processing apparatus 10 outputs only one piece of image information, the video for the left eye and the video for the right eye may be generated at the relay apparatus 30 based on the image information. In this case, the video for the left eye and the video for the right eye are the same. That is, in this case, the display apparatus 40 displays the same videos on the left and right optical elements 42.

The camera 43 includes a pair of imaging elements 430L and 430R (referred to collectively as imaging elements 430 in the following descriptions when the difference between the left and the right is not required), the imaging element 430L being disposed on a little left side with respect to a center portion of a front surface (an eye direction side of the user) of the display apparatus 40, the imaging element 430R being disposed on a little right side with respect to the center portion. The camera 43 captures an image of the real space on the eye direction side of the user, which is captured by each imaging element 430, and outputs image data obtained by the capturing via the relay apparatus 30 to the image processing apparatus 10.

As one example, the sensor 44 may include a head direction sensor 441 that detects a direction of the head of the user (a front direction of the face of the user) wearing the display apparatus 40 and a position of the head of the user.

The head direction sensor 441 detects the direction of the head (the direction of the face) of the user. In particular, the head direction sensor 441 is a gyro or the like. The head direction sensor 441 detects and outputs a rotation angle in the head direction within a plane parallel to the floor surface, a rotation angle in an elevation angle direction, and a rotation angle around an axis in a visual field direction with respect to the initial direction when the user wears the display apparatus 40. In addition, with a predetermined position of the display apparatus 40 (for example, a position of a point that bisects a line segment connecting the imaging element 430L and the imaging element 430R of the camera 43) being set as a reference position, the head direction sensor 441 detects and outputs a movement amount (x, y, z) of this reference position from the position at the time when the user wears the display apparatus 40, in a left-right direction of the user (an axis where a transverse plane and a coronal plane intersect each other; hereinafter referred to as an X axis), a front-back direction thereof (an axis where a sagittal plane and the transverse plane intersect each other; hereinafter referred to as a Y axis), and an upward-downward direction thereof (referred to as a Z axis). Note that an XYZ coordinate system in this case is referred to as a user coordinate system. Relative coordinates of each imaging element 430 with this reference position set as the original point are known.

The communication interface 45 is an interface for performing communication of data such as a video signal and image data between the display apparatus 40 and the relay apparatus 30. For example, if the display apparatus 40 receives and sends data by a wireless communication such as wireless local area network (LAN) or Bluetooth (registered trademark) between the display apparatus 40 and the relay apparatus 30, the communication interface 45 includes an antenna for communication and a communication module.

Figure 2:
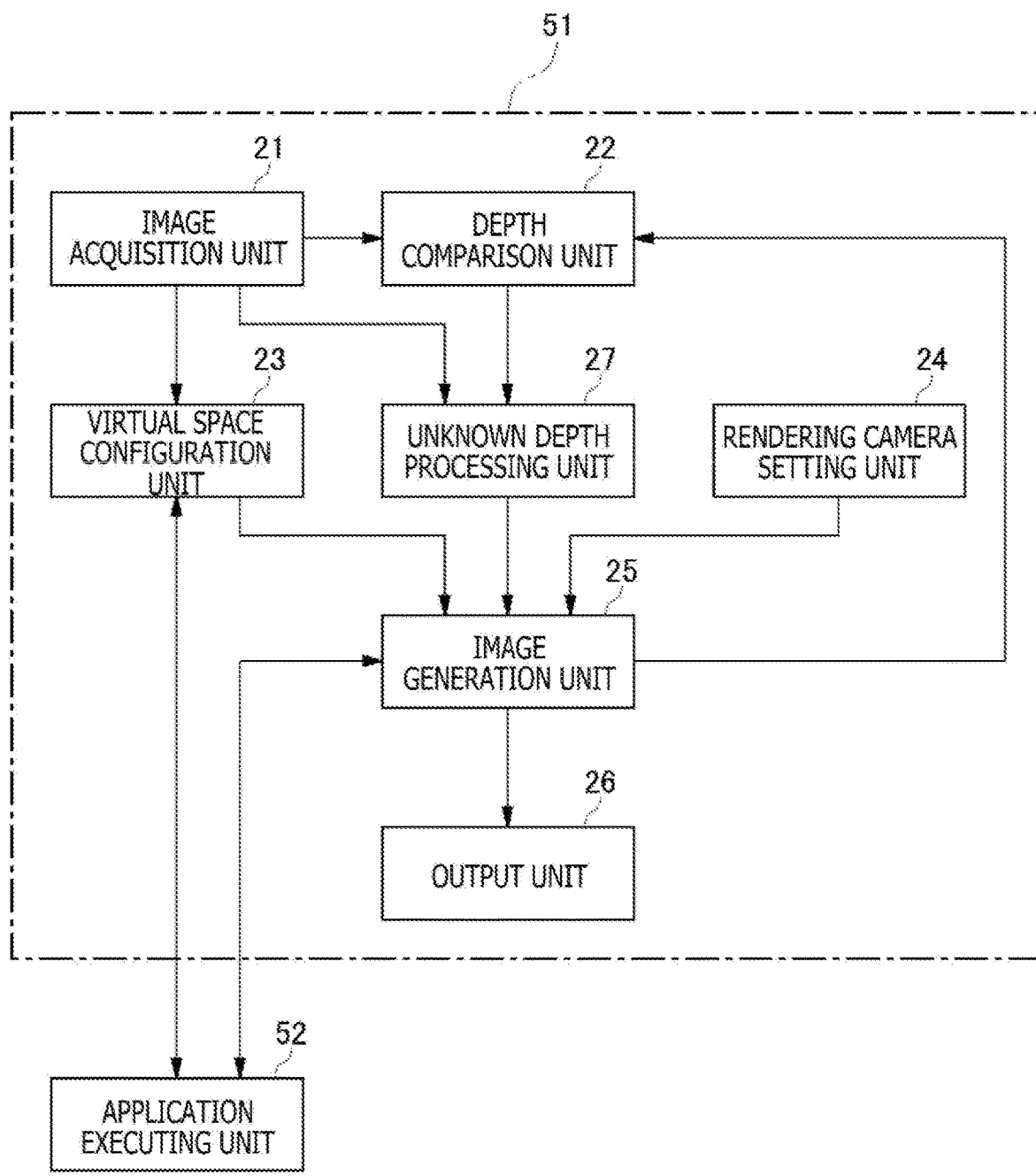
FIG. 2 is a functional block diagram illustrating an example of the image processing apparatus according to the embodiment of the present invention.

Next, an operation of the control unit 11 of the image processing apparatus 10 according to the embodiment of the present invention is described. The control unit 11 executes the program stored in the storage unit 12 and thereby, as illustrated in FIG. 2, functionally includes an image processing unit 51 and an application executing unit 52. The image processing unit 51 includes an image acquisition unit 21, a depth comparison unit 22, a virtual space configuration unit 23, a rendering camera setting unit 24, an image generation unit 25, an output unit 26, and an unknown depth processing unit 27. The image processing unit 51 operates according to an instruction input from the application executing unit 52, and generates as a stereovision image a pair of pieces of image data (image data for the left eye and image data for the right eye) obtained by rendering an image of the virtual space in a designated visual field.

At least part of the functions of the control unit 11 of the image processing apparatus 10 may be incorporated in the display apparatus 40. Further, at least part of the functions of the control unit 11 of the image processing apparatus 10 may be incorporated in a cloud server connected through a network.

The image acquisition unit 21 acquires information of the real space around the user wearing the display apparatus 40. In particular, the information of the real space obtained by the image acquisition unit 21 is image data captured by the camera 43 of the display apparatus 40. In this example, the image acquisition unit 21 receives the image data captured by the camera 43 via the relay apparatus 30 from the display apparatus 40 as the information of the real space. In one example of the present embodiment, the image data captured by the camera 43 is a pair of pieces of image data captured by the pair of imaging elements 430 disposed on the left and the right. Based on a parallax of each piece of the image data, a distance to an object in the real space imaged can be decided. In the present embodiment, based on the image data captured by the camera 43, the image acquisition unit 21 generates and outputs image data having the same size (the same pixel array) as the image data (hereinafter referred to as captured image data for the purpose of distinction). In the generated and output image data, depth information representing the distance to the object imaged in each pixel of the image data captured by the camera 43 is set as a pixel value corresponding to the pixel, which is a so-called depth map.

The image acquisition unit 21 provides the depth map of the captured image to the depth comparison unit 22 and the virtual space configuration unit 23.

The virtual space configuration unit 23 first generates environment mesh list information and a body buffer based on the information of the depth map output by the image acquisition unit 21. Here, for example, the environment mesh list information is acquired as follows.

That is, the virtual space configuration unit 23 uses the depth map and the captured image data to perform segmentation processing for detecting objects in the real space imaged in the captured image data for each object (for each object such as a desk, a wall, a floor, or a bookshelf). In addition, the virtual space configuration unit 23 sets an individual label (object identifier) for each region on the depth map occupied by each object.

The virtual space configuration unit 23 sets a mesh (polygon mesh) along an outer shape of the object in the region, with reference to the depth map in the region that is individually labeled. When the user changes the position thereof or turns the head thereof, the visual field of the camera 43 changes. Thereby, the shape of the object in the real space may become apparent (for example, a portion that has been hidden by another object may be imaged). In such a case, the mesh of the object is updated. As for this mesh setting method, since a widely known method can be employed in which, for example, multi-view information is used, the detailed description thereof is omitted here.

The virtual space configuration unit 23 generates the environment mesh list information including vertex coordinates of each set mesh (information representing a position of a pixel), identification information of the mesh, information of a normal line of the object imaged in a pixel in the captured image data correspondingly to a pixel in the mesh, type information of the mesh (information representing any of predefined types), information regarding a surface shape of the mesh, and an object identifier of the object corresponding to the mesh. Note that the vertex coordinates of the mesh may be a value in a world coordinate system (an orthogonal coordinate system that is set in the real space and includes a $\xi$ axis and an $\eta$ axis orthogonal to each other in the floor surface, and a $\zeta$ axis in a vertical direction). In addition, the object identifier may be included in the identification information of the mesh.

For example, a value in this world coordinate system is obtained by converting a value in the vertex coordinates and the like of the mesh acquired in the user coordinate system (XYZ coordinate system) based on the image data obtained in the real space captured by the camera 43, using a model view matrix as coordinate conversion information.

The type information of the mesh is information generated based on the position of the object imaged in a pixel in the captured image data corresponding to a pixel in the mesh, and represents any of a floor, a ceiling, a wall, an obstruction (predefined as a body or the like other than walls within a predetermined height from the floor), and the like. In the present embodiment, the virtual space configuration unit 23 sets a plane on which a z axis component is the smallest (that is, it is located at the lowest position) as a floor in the world coordinate system of the object (the orthogonal coordinate system that is set in the real space and includes the x axis and the y axis orthogonal to each other in the floor surface and the z axis in the vertical direction). In addition, a plane on which the z axis component is the greatest (that is, it is located at the highest position) is set as a ceiling. Moreover, a plane that is perpendicular to the floor and is located at the farthest position in the x-axis direction or the y-axis direction is set as a wall. Other objects are classified as obstructions.

In addition, the information regarding the surface shape of the mesh represents any of surface shapes such as a flat surface, a surface with recesses and protrusions, a spherical surface, and a surface with a complicated shape. This information can be defined based on, for example, the information of a normal line of each mesh representing an object.

In this manner, there are various methods for recognizing the type, the surface shape, or the like of an object in the captured image data based on the information of the depth map and the like. However, herein, it does not matter which method is employed.

The body buffer is a representation that virtually expresses the real space (hereinafter referred to as the target space) of a predetermined size around the user including the position of the user and the rear side with respect to the visual field direction of the user, with a voxel space (voxel: a virtual volume element, for example, a cubic element of 10 cm in width, 10 cm in depth, and 10 cm in height). For example, the predetermined size is a cuboid range of 10 m in width (the direction that is orthogonal to the initial visual field direction of the user and is parallel to the floor surface), 10 m in depth (the initial visual field direction of the user parallel to the floor surface), and 3 m in height. A value of a voxel (voxel value) in which a body exists is set as "1," a value of a voxel in which no body exists is set as "0," and a value of a voxel in which it is unclear whether a body exists or not is set as "−1" (FIG. 4).

For the convenience of illustration, FIG. 4 illustrates only some of voxels in the target space. In addition, in FIG. 4, also the size of each voxel is changed appropriately for the purpose of description. The size of each voxel with respect to this target space does not necessarily indicate the appropriate size in implementation. Further, FIG. 4 illustrates an example in which a cubic body M is disposed at a corner on a depth side in the target space, a value of a voxel corresponding to surfaces of the body M (surfaces the user can see) is set as "1," representing that a body exists, a value of a voxel of a portion hidden from the surfaces (portion the user cannot see) is set as "−1," representing that it is unclear whether a body exists or not, and a value of a voxel existing in a space up to the surfaces of the body M (a voxel corresponding to a portion at which the body M does not exist) is set as "0," representing that no body exists.

The virtual space configuration unit 23 sets these voxel values based on the information of the depth map. Each pixel on the depth map is obtained by dividing a bottom face of a virtual square pyramid corresponding to an angle of view of the depth map by a resolution of the depth map (py pixels in height×px pixels in width), the virtual square pyramid having a vertex at the position coordinates of the camera 43 at the time of capturing the image data that is original data of the depth map (the position coordinates may be the coordinates of the reference position; hereinafter referred to as a position in image capturing). Here, there may be set a vector parallel to a line segment having a starting point at the coordinates at the position in image capturing and passing through a vertex of each pixel (coordinate difference in the world coordinate system), and a vector parallel to a line segment having a starting point at the coordinates at the position in image capturing and passing through the center of each pixel (coordinate difference in the world coordinate system). Such vectors can be calculated, as a direction of each pixel, based on the coordinates at the position in image capturing, information representing the angle of view of the depth map, and the resolution of the depth map.

As for each pixel on the depth map, the virtual space configuration unit 23 sets, as "1," a value of a voxel which is located in the direction of the pixel from the coordinates in the body buffer corresponding to the coordinates of the position in image capturing (the coordinates may be the coordinates of the reference position) and corresponds to the distance to the body represented by the depth map. The virtual space configuration unit 23 sets, as "0," a value of a voxel that is different from the voxel of "1" and is located on a line extending from the voxel of "1" to the camera 43. In addition, on the image data captured by the camera 43, there may be a portion that is hidden by a body in the real space and therefore is not imaged (that is, a portion on a back side of a desk or a wall, or a portion behind a body placed on the floor). The virtual space configuration unit 23 sets, as "−1," a value of a voxel corresponding to such a hidden portion, representing that it is unclear whether a body exists or not.

When the user moves or changes the direction of the head thereof, the viewpoint and the visual field direction are changed. At that time, the depth map of a portion may be obtained on the image data captured by the camera 43 directed from the viewpoint to the visual field direction, the portion having not been imaged and corresponding to the voxel in which it is unclear whether or not a body exists (the portion corresponding to the voxel whose value is set as "−1"). In this case, the virtual space configuration unit 23 sets the value of the voxel of such a portion as "0" or "1," based on the obtained depth map, and updates the setting.

As for the method for setting the voxel value in the three-dimensional space that represents a range in which such bodies exist based on the information regarding the depth map and the like, various methods such as a widely known method as a 3D scan method can also be employed, in addition to the method described herein.

Furthermore, based on a position and a visual field of a virtual rendering camera set in the target space by the rendering camera setting unit 24 described later, the same visual field as that of the virtual rendering camera is set in the voxel space corresponding to the target space. The virtual space configuration unit 23 generates a two-dimensional projection image of voxels in the visual field at that time.

Therefore, this two-dimensional projection image of voxels is obtained in the following manner. Similarly to rendering processing, a virtual screen is disposed at a position separated by a predefined distance in the visual field direction of the virtual rendering camera from the position of the virtual rendering camera, the virtual screen being orthogonal to the visual field direction and having a size corresponding to the set angle of view. On this screen, a pixel array of the same size as image data included in a stereovision image generated by the image generation unit 25 is set, and each pixel in the pixel array is set as follows.

That is, while sequentially selecting pixels in this pixel array, the virtual space configuration unit 23 sets, as a pixel value of the selected pixel, a value of a voxel which is located at a position on an extension of a line extending from the position of the virtual rendering camera to a position of the selected pixel and which is the first voxel having a value other than "0" the extension meets. If there is no voxel having a value other than "0," the virtual space configuration unit 23 sets the pixel value of the selected pixel as "0."

Thereby, for example, the two-dimensional projection image as illustrated in FIG. 5 is obtained. The virtual space configuration unit 23 outputs this two-dimensional projection image to the application executing unit 52.

In addition, the virtual space configuration unit 23 generates the information regarding the virtual space in which a virtual object is disposed at the position in the virtual space corresponding to the position of the detected object described above in the real space (a range of the mesh corresponding to the object) according to an instruction input from the application executing unit 52 described above, thereby configuring the virtual space. Since the processing for disposing the virtual object represented by three-dimensional model data in the virtual space in this manner is widely known in the processing for creating three-dimensional graphics, the detailed description thereof is omitted.

As a specific example, the virtual space configuration unit 23 receives from the application executing unit 52 inputs of background image data that is a background image, information for identifying an object in the real space (object identifier), three-dimensional model data of a body to be disposed at a position in the virtual space corresponding to a position of the object identified by the information, data of a texture (material) to be applied to the surface of the body, and the like.

The virtual space configuration unit 23 generates information for specifying the virtual space by disposing, for each of the input object identifiers, a virtual object represented by the three-dimensional model data input together with the object identifier in a range with which a mesh that represents an outer shape of the object represented by the object identifier is circumscribed, and by setting a texture (set in advance) corresponding to the information regarding the material input together with the object identifier.

The rendering camera setting unit 24 sets the position of the virtual rendering camera, the visual field direction (the direction of the rendering camera), and the angle of view at the time of performing the rendering. In the present embodiment, regardless of, for example, positions of the imaging elements 430 included in the camera 43, the rendering camera setting unit 24 obtains the information representing the predefined position of the rendering camera (for example, it may be hard-coded in a program, or may be read out from a setting file) and the information representing the visual field direction (for example, information regarding a vector in which the position of the rendering camera is set as a starting point and which passes through the center of the visual field). The rendering camera setting unit 24 sets the above information as visual field information.

In addition, as another example, the rendering camera setting unit 24 may obtain the position of the rendering camera in the virtual space, as relative coordinates with respect to the reference position in the real space that varies in time with movement of the user. As one example, the position in the virtual space corresponding to the position moved by a predefined relative coordinate value from the aforementioned reference position may be set as the position of the rendering camera.

The relative coordinates here may be, for example, relative coordinates from the reference position to the position of the imaging element 430R or 430L. In addition, the relative coordinates may be relative coordinates from the reference position to the position at which the right eye (or the left eye) of the user wearing the display apparatus 40 is supposed to be located. In this case, the position in the virtual space corresponding to the position of the right eye (or the left eye) of the user is set as the position of the rendering camera.

In particular, the rendering camera setting unit 24 acquires information representing the position (reference position) and the direction of the head of the user wearing the display apparatus 40, from the head direction sensor 441 in the display apparatus 40. That is, the rendering camera setting unit 24 acquires a rotation angle $\theta$ in the head direction within the plane parallel to the floor surface, a rotation angle $\varphi$ in the elevation angle direction, and a rotation angle $\psi$ around the axis in the visual field direction with respect to the initial direction when the user wears the display apparatus 40, which angles are illustrated in FIG. 3, and the movement amount (x, y, z) of the head.

The rendering camera setting unit 24 obtains the coordinates in the virtual space corresponding to the reference position, based on information regarding the movement amount of the head. With the world coordinates in the real space being matched with the coordinates in the virtual space, the coordinate value in the real space may be used as it is as the coordinate value in the virtual space. The rendering camera setting unit 24 adds the relative coordinates (set in advance) from the reference position to the position of the right eye of the user to the coordinate value of the reference position to determine the position of the rendering camera corresponding to the right eye, and sets the direction of the head of the user as the visual field direction.

In addition, the rendering camera setting unit 24 adds the relative coordinates (set in advance) from the reference position to the position of the left eye of the user to the coordinate value of the reference position to determine the position of the rendering camera corresponding to the left eye, and sets the direction of the head of the user as the visual field direction. Note that the angle of view is set in advance.

The image generation unit 25 uses the information regarding the positions, the visual field directions, and the angle of view of the rendering cameras individually corresponding to the left eye and the right eye set by the rendering camera setting unit 24, to render a stereovision image (image data for each of the left and right eyes) of the virtual object disposed in the virtual space with reference to the information generated by the virtual space configuration unit 23 for specifying the virtual space.

The image generation unit 25 provides the depth map of the stereovision image of the virtual object to the depth comparison unit 22.

The depth comparison unit 22 compares the depth map of the captured image and the depth map of the stereovision image of the virtual object with each other to calculate a difference between depth values for each pixel. In particular, the depth comparison unit 22 configures a depth comparison unit that decides an unknown depth region by comparing the depth information of an image of the real space and the depth information of an image of the virtual space with each other. In the case where an absolute value of the difference between the depth values for each pixel exceeds a predetermined threshold value, the depth comparison unit 22 marks the pixel as an unknown depth pixel. The predetermined threshold value is set, for example, to 1 cm or the like in accordance with the magnitude of the target space. In the case where pixels marked as unknown depth pixels form a fixed region, the depth comparison unit 22 decides the region as unknown depth region. The depth comparison unit 22 notifies the unknown depth processing unit 27 of the unknown depth region.

In the case where a static body existing in the real space is replaced with a virtual object to be displayed, since the depth of the captured image in the real space and the depth of the rendered image in the virtual space substantially coincide with each other, an unknown depth region in which the absolute value of the difference between depth values exceeds the predetermined threshold value does not exist. The reason why the predetermined threshold value is provided to evaluate the difference between depth values is that, in the case where a real body is replaced with a virtual object, since the depth values do not completely coincide with each other and the depth value somewhat changes depending on the pixel position, unless a threshold value is provided to compare depth values with each other, noise is generated. However, in the case where a dynamic body enters the real space later, since there is no virtual object with which the dynamic body is to be replaced, in a region in which the dynamic body is actually captured, a great difference exceeding the predetermined threshold value appears between the depth of the captured image and the depth of the image in the virtual space, resulting in an unknown depth region.

The unknown depth processing unit 27 instructs the image generation unit 25 to display information indicative of presence of an unknown object in an unknown depth region. In the case where an actually captured image of an unknown object is to be used as the information indicative of presence of an unknown object, the unknown depth processing unit 27 acquires image data of the unknown object actually captured in the unknown depth region of the captured image from the image acquisition unit 21 and provides the image data of the unknown object to the image generation unit 25.

In the case where an unknown depth region exists, the image generation unit 25 displays information indicative of presence of an unknown object in an image of the virtual space. In the case where an actually captured image of an unknown object is to be used as the information indicative of presence of an unknown object, the image generation unit 25 superimposes the image of the unknown object provided from the unknown depth processing unit 27 as it is on the unknown depth region of the image in the virtual space. In the case where a substitute virtual object is to be used in place of an actually imaged unknown object, the image generation unit 25 renders the substitute virtual object in the virtual space and superimposes it in the unknown depth region of the image of the virtual space.

The image generation unit 25 may add a video effect to the unknown depth region for display, as information indicative of presence of an unknown object, in place of superimposing an actually captured image of an unknown object or an image of a substitute virtual object in the unknown depth region. Examples of the video effect include display of a cloud of smoke, flicker of light, and display of an image representative of attention or caution. The image generation unit 25 may superimpose the actually captured image of the unknown object or the image of the substitute virtual object on the unknown depth region and, in this state, add a video effect to the unknown depth region. Attention and caution of the user can be called further.

The image generation unit 25 outputs the pair of pieces of image data obtained by the rendering as a stereovision image to the output unit 26. Since this rendering method is widely known, the detailed description thereof is omitted.

The output unit 26 outputs the stereovision image input from the image generation unit 25 to the display apparatus 40 via the relay apparatus 30.

The application executing unit 52 executes, for example, a program of a game. In the example of the present embodiment, the application executing unit 52 receives an input of the information regarding the two-dimensional projection image of voxels and an input of the environment mesh list information, from the image processing unit 51.

In addition, the application executing unit 52 determines the three-dimensional model data of the virtual object to be disposed in the virtual space according to the processing of the game. As a specific example, this determination method is described as follows. That is, in the case where the value of a voxel is "1," following determinations are performed considering the mesh of the corresponding portion:

(1) If the type of the mesh is a "ceiling," a background is synthesized.

(2) If the type of the mesh is an obstruction and the surface of the mesh is flat, the body is set as an "operation panel."

(3) If the type of the mesh is an obstruction and the surface of the mesh includes recesses and protrusions, the body is set as a "rock" or a "box."

(4) If the type of the mesh is an obstruction and the surface of the mesh is spherical, the body is set as a "light."

(5) If the type of the mesh is an obstruction and the surface of the mesh is in a complicated shape, the body is set as "tree or plant."

Figure 6:
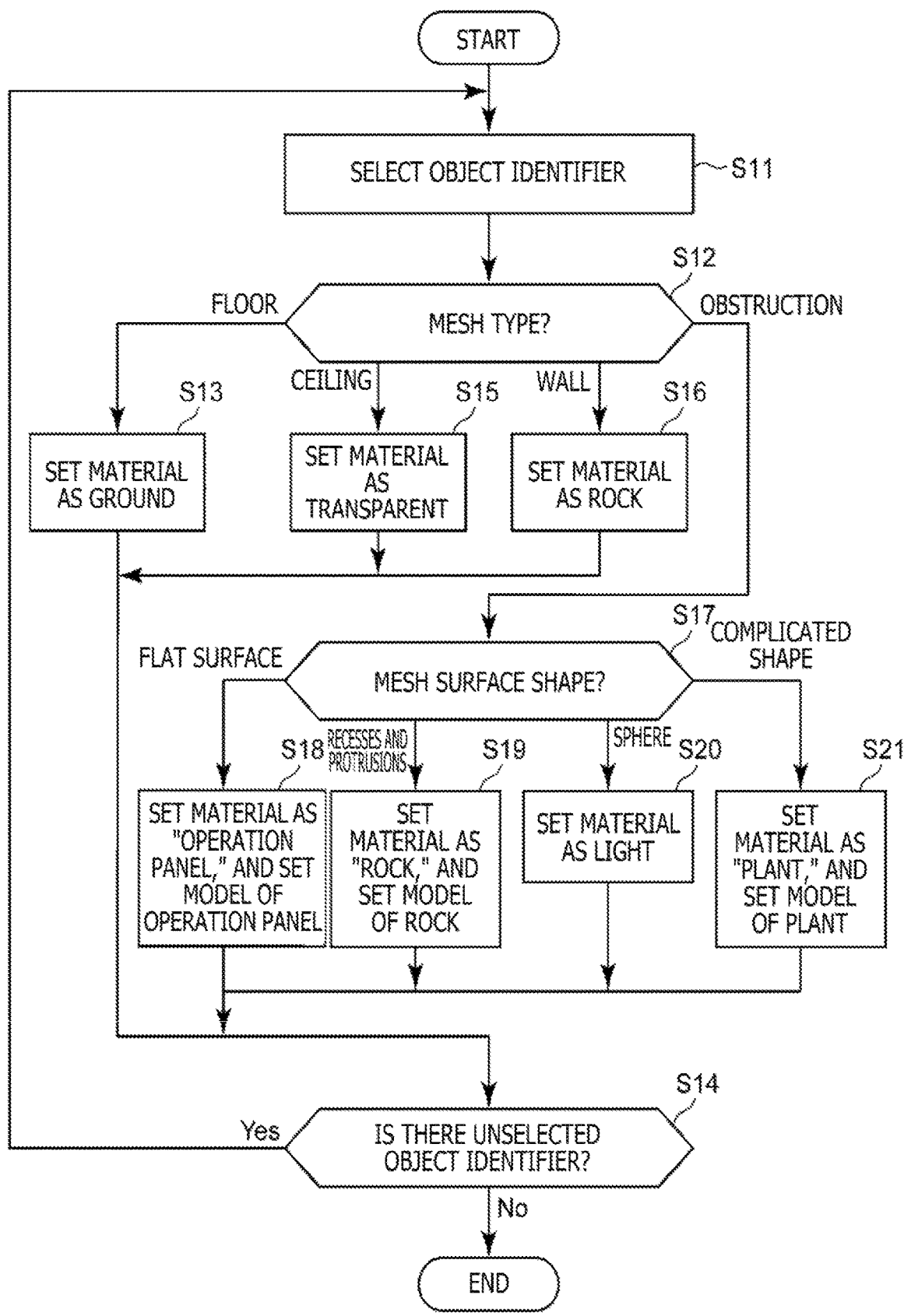
FIG. 6 is a flowchart illustrating an operational example of the image processing apparatus according to the embodiment of the present invention.

With reference to FIG. 6, an operation of the application executing unit 52 based on this example is described. As illustrated in FIG. 5, the application executing unit 52 refers to the input environment mesh list information, and selects one of unselected object identifiers (S11).

The application executing unit 52 refers to the information regarding the mesh type of the selected object identifier (S12) and, if the mesh type is the "floor," relates a setting in which the material is set as ground to the selected object identifier (S13). The application executing unit 52 then decides whether there is another unselected object identifier or not (S14). If there is another unselected object identifier, the processing returns to the process S11 and continues.

At the process S12, if the mesh type is the "ceiling," the application executing unit 52 relates a setting in which the material is set as "transparent" to the selected object identifier (S15; therefore, the background image is displayed on that portion), and then the processing proceeds to the process S14.

At the process S12, if the mesh type is the "wall," the application executing unit 52 relates, to the selected object identifier, a setting in which the material is set as "rock" and the "rock" data is to be used as the three-dimensional model data of the body (S16), and the processing proceeds to the process S14. Further, at the process S12, if the mesh type is the "obstruction," the application executing unit 52 refers to the information regarding the surface shape of the mesh (S17). If the surface shape is the "flat surface," the application executing unit 52 relates, to the selected object identifier, a setting in which the material is set as "operation panel" and the "operation panel" is to be used as the three-dimensional model data of the body (S18), and the processing proceeds to the process S14.

At the process S17, if the surface shape is the "surface with recesses and protrusions," the application executing unit 52 relates, to the selected object identifier, the setting in which the material is set as "rock" and the "rock" data is to be used as the three-dimensional model data of the body (S19), and the processing proceeds to the process S14. At the process S17, if the surface shape is "spherical," the application executing unit 52 relates a setting in which the material is set as "light" to the selected object identifier (S20), and the processing proceeds to the process S14.

At the process S17, if the surface shape is the "complicated shape," the application executing unit 52 relates, to the selected object identifier, a setting in which the material is set as "plant" and the "plant" is to be used as the three-dimensional model data of the body (S21), and the processing proceeds to the process S14.

At the process S14, if there is no unselected object identifier, the application executing unit 52 ends the processing.

As a result, based on the setting of the three-dimensional model data and the material for each of the obtained object identifiers, the virtual space configuration unit 23 configures the virtual space.

Note that the processing herein is merely one example. Depending on game contents, based on the image in which the real space is captured, a virtual object having the same shape and same surface texture as those of a body in the real space may be disposed at the position in the virtual space corresponding to the position of the body in the real space. In this example, the image of the real space in which the user exists is reconfigured as the virtual space in the game. Each of the images in the visual fields of the pair of virtual cameras disposed in the three-dimensional space correspondingly to the eyes of the user (that is, the pair of cameras disposed at the positions corresponding to the left and right eyes of the user and oriented in the visual field direction of the user) is rendered, and is displayed on the display apparatus 40.

The application executing unit 52 may also refer to the input two-dimensional projection image of voxels and dispose a virtual object providing a predefined type of visual effect in a region that is set as "−1" in the projection image, that is, at a position in the virtual space corresponding to the position at which no object is detected in the real space. In particular, the application executing unit 52 may output to the image processing unit 51 an instruction for displaying a video effect or image designated as a process in the game, together with the information for identifying the region set as "−1" in the two-dimensional projection image of voxels (the information may be information for identifying a pixel in the region).

Here, examples of the video effect include display of a video of smoke and flicker of light. In addition, the image to be displayed may be an image of "?" or the like, or an image representing attention and caution.

When the image processing unit 51 receives this instruction, it synthesizes the designated video effect or the designated image on the pixel in the designated range and outputs the resulting image.

(Operation)

Figure 7:
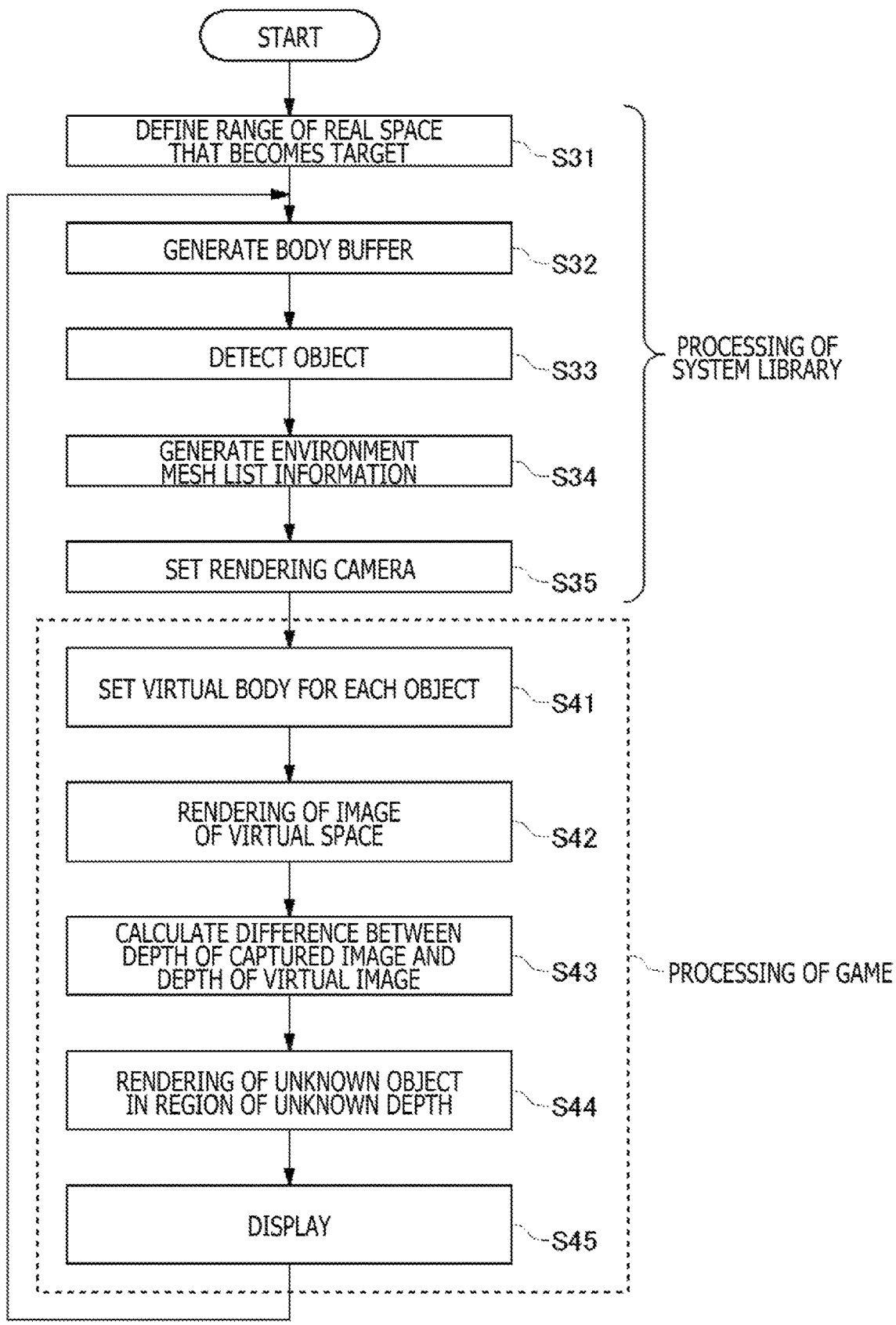
FIG. 7 is a flowchart illustrating an operational example of the image processing apparatus according to the embodiment of the present invention.

In the embodiment of the present invention, the image processing apparatus 10 includes the above configurations basically, and operates as follows. When the user wears the display apparatus 40 on the head thereof, the image processing apparatus 10 starts the processing illustrated in FIG. 7, and sets a world coordinate system.

The image processing apparatus 10 sets, as a target space, a real space in a cuboid range having the original point at a predetermined position of the display apparatus 40 (for example, the gravity center position of the imaging elements 430 of the camera 43) with ±5 m (10 m in total) in the X-axis direction and ±5 m (10 m in total) in the Y-axis direction centered at the user including the rear side with respect to the initial eye direction of the user, and 3 m in height from the floor in the Z-axis direction (S31).

The image processing apparatus 10 sets a body buffer obtained by virtually representing this target space as a voxel space (voxel: a virtual volume element, for example, a cubic element with 10 cm in width, 10 cm in depth, and 10 cm in height). In the body buffer, all voxel values are initially set as "−1." The image processing apparatus 10 then stores the body buffer in the storage unit 12 (S32).

The display apparatus 40 repeatedly captures an image by the camera 43 in every predetermined timing (for example, every 1/1000 second), and sends the captured image data obtained by the capturing to the image processing apparatus 10. The image processing apparatus 10 receives the captured image data via the relay apparatus 30 from the display apparatus 40. In addition, the image processing apparatus 10 generates, based on this captured image data, a depth map obtained from the image data.

The image processing apparatus 10 uses the generated depth map to detect an object (a ceiling, a floor, a wall, a piece of furniture and the like) in the real space (S33). In addition, the image processing apparatus 10 decides the type and the surface shape of the mesh (polygon mesh) representing the shape of the detected object. The image processing apparatus 10 then relates the information representing the position of the generated mesh (the information may be vertex coordinates of the mesh), the information regarding the mesh type, and the information regarding the surface shape to one another, and stores those pieces of information in the storage unit 12 as the environment mesh list information (S34: Generate environment mesh list information).

The image processing apparatus 10 detects a movement of the head of the user and the direction of the head with the sensor 44, and sets the position and the visual field of the rendering camera based on the detected information regarding the movement and the direction of the head (S35).

The image processing apparatus 10 further obtains, while sequentially selecting the pixels in the depth map, the position coordinates of the reference position in the world coordinate system based on the movement of the head of the user detected by the sensor 44. The image processing apparatus 10 sets, as "1," a value of a voxel corresponding to the distance from the coordinates in the body buffer corresponding to the obtained position coordinates to the body represented by the pixel selected in the depth map. The image processing apparatus 10 sets, as "0," a value of a voxel that is different from the voxel of "1" and is located on a line extending from the voxel of "1" to the camera 43. In the image data captured by the camera 43, there may be a portion that is hidden by a body in the real space and therefore is not imaged. As for such a hidden portion, the image processing apparatus 10 keeps the value of the voxel of the corresponding portion unchanged as "−1," representing that it is unclear whether a body exists or not.

When the user moves or changes the direction of the head thereof, a depth map of a portion corresponding to the voxel that is not imaged previously and in which it is unclear whether a body exists or not (the portion corresponding to the voxel whose value has been "−1") may be obtained on the image data captured by the camera 43. At that time, at the process S11, the image processing apparatus 10 updates the value of the voxel of the portion by setting the value as "0" or "1" based on the obtained depth map.

The image processing apparatus 10 generates a projection image obtained by two-dimensionally projecting the voxel located in the visual field direction of the camera 43 in the body buffer from the position coordinates of the rendering camera (FIG. 5).

The image processing apparatus 10 also performs the following processing with reference to the environment mesh list information and the information regarding the two-dimensional projection image of voxels, as processing of the game.

That is, the image processing apparatus 10 disposes a corresponding virtual object in a region within the virtual space corresponding to the real space in which an object exists, with reference to the environment mesh list information, for each detected object, based on the information regarding the type and the surface shape of the mesh, and configures the virtual space (S41). Note that, as for the background image used for the configuration of the virtual space, the three-dimensional model data of the virtual object, and the like, data prepared as game data by a game provider may be used.

As one example, in the case where the user who wears the display apparatus 40 exists in a room in which a desk, a bookshelf, a television stand, a television, and the like are placed on a flat floor surface and which is surrounded by walls on all four sides thereof, a top board of the desk is decided as the mesh of an obstruction with flat surface shape. The image processing apparatus 10 then performs a setting in which, for example, a virtual object of "operation panel" is disposed at the position of this top board. As for the wall, the image processing apparatus 10 performs a setting in which a virtual rock is disposed such that the surface of a virtual object visually recognized as a "rock" is located at the position of the wall surface. Further, the image processing apparatus 10 sets a range corresponding to the ceiling as a transparent material so as to synthesize a background image, and configures the virtual space as if there is no ceiling.

The image processing apparatus 10 then creates a virtual stereovision image by rendering processing such that, in the configured virtual space, the range of the set visual field is viewed from the position of the rendering camera set in the process S35 (S42). At that time, based on the projection image obtained by two-dimensionally projecting the voxel of the body buffer, the image processing apparatus 10 may set a predetermined video effect such as an effect of making smoke for a portion at which it is unclear whether a body exists or not.

The image processing apparatus 10 compares the depth map of the captured image and the depth map of the virtual stereovision image with each other to determine the difference between the depth values for each pixel (S43).

The image processing apparatus 10 decides a region in which the absolute value of the difference between depth values of the pixel exceeds a predetermined threshold value as an unknown depth region and renders an unknown object in the unknown depth region (S44). The unknown object is an actually captured image of an object or a substitute virtual object. The image processing apparatus 10 may add a video effect to the unknown depth region or may display information for calling attention or caution.

The image processing apparatus 10 sends thus generated stereovision image data to the display apparatus 40, and causes the display apparatus 40 to display the stereovision image (S45).

When the user moves or the head thereof moves, the position and the visual field direction of the camera 43 are changed. At that time, based on the image captured newly in the captured image data, the information regarding the voxel space and the environment mesh list information are updated. In addition, in the case where the position and the visual field of the rendering camera are set based on the position and the direction of the head of the user, the position and the visual field of the rendering camera are also updated. The image processing apparatus 10 refers to this updated information to perform the rendering processing, and updates the stereovision image data to display it.

Furthermore, the image processing apparatus 10 executes, when the user touches the virtual operation panel located at the position in the virtual space corresponding to the top board of the desk, processing for receiving an operation performed on the operation panel, as processing of the game. At that time, the user touches the top board of the desk in the real space if the user reaches out its hand for the position of the operation panel in the virtual space. Therefore, the user can also get a tactile feedback. In addition, the user may not attempt to move to a range in which there is the top board of the desk (since the operation panel is displayed, the user may not move so as to push the operation panel away). In such a manner, it is possible for the user to naturally perceive the position of an obstruction existing around the user in the processing of the game.

A stereovision image rendered by the image processing apparatus 10 is described with reference to FIGS. 8 to 11. Here, for the simplification of description, image data of one eye (left eye or right eye) is exemplified.

Figure 8:
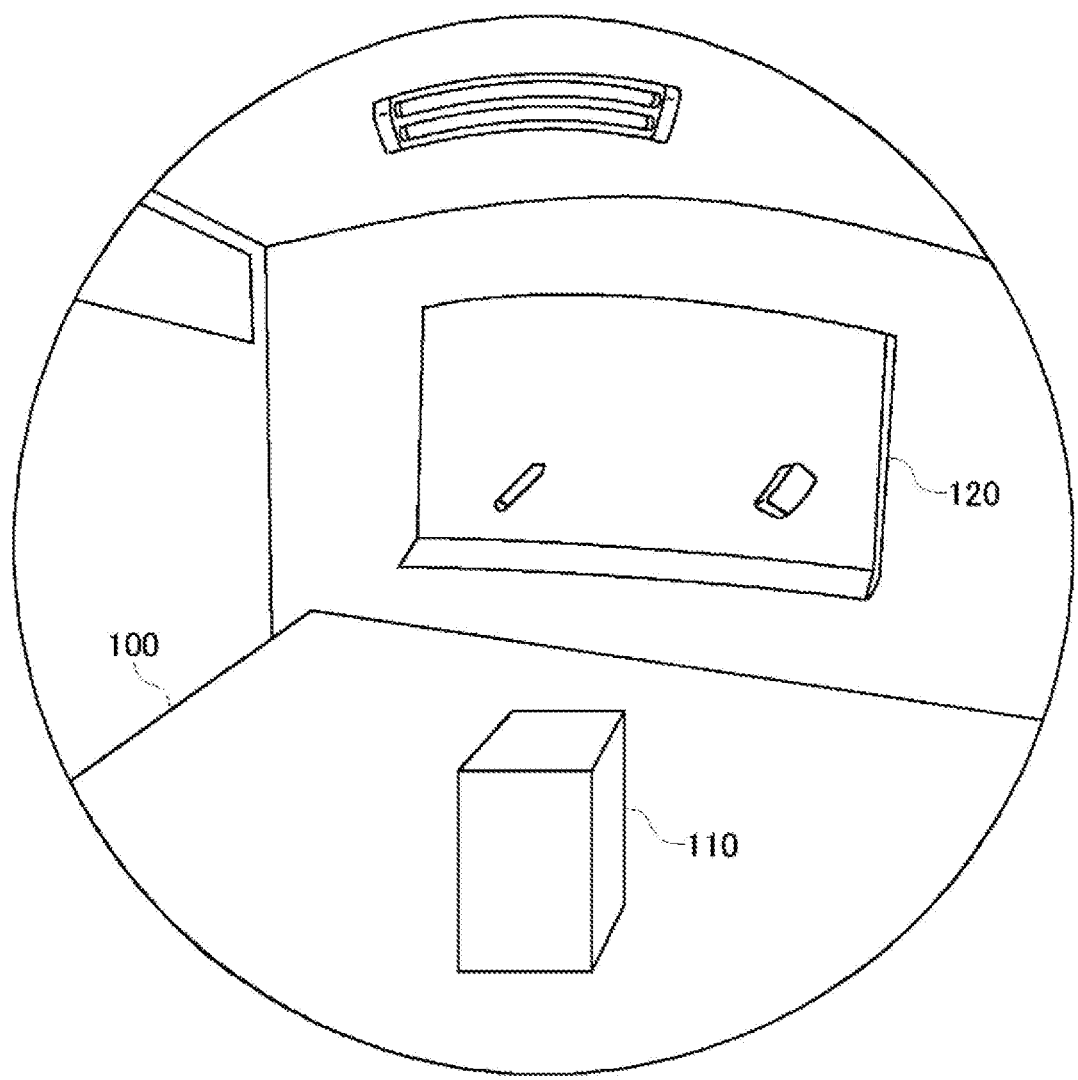
FIG. 8 is a view illustrating captured image data acquired by the image processing apparatus according to the embodiment of the present invention.

FIG. 8 is a view illustrating captured image data acquired by the image acquisition unit 21. A box 110 is placed on a white desk, and a white board 120 is hung on the wall.

Figure 9:
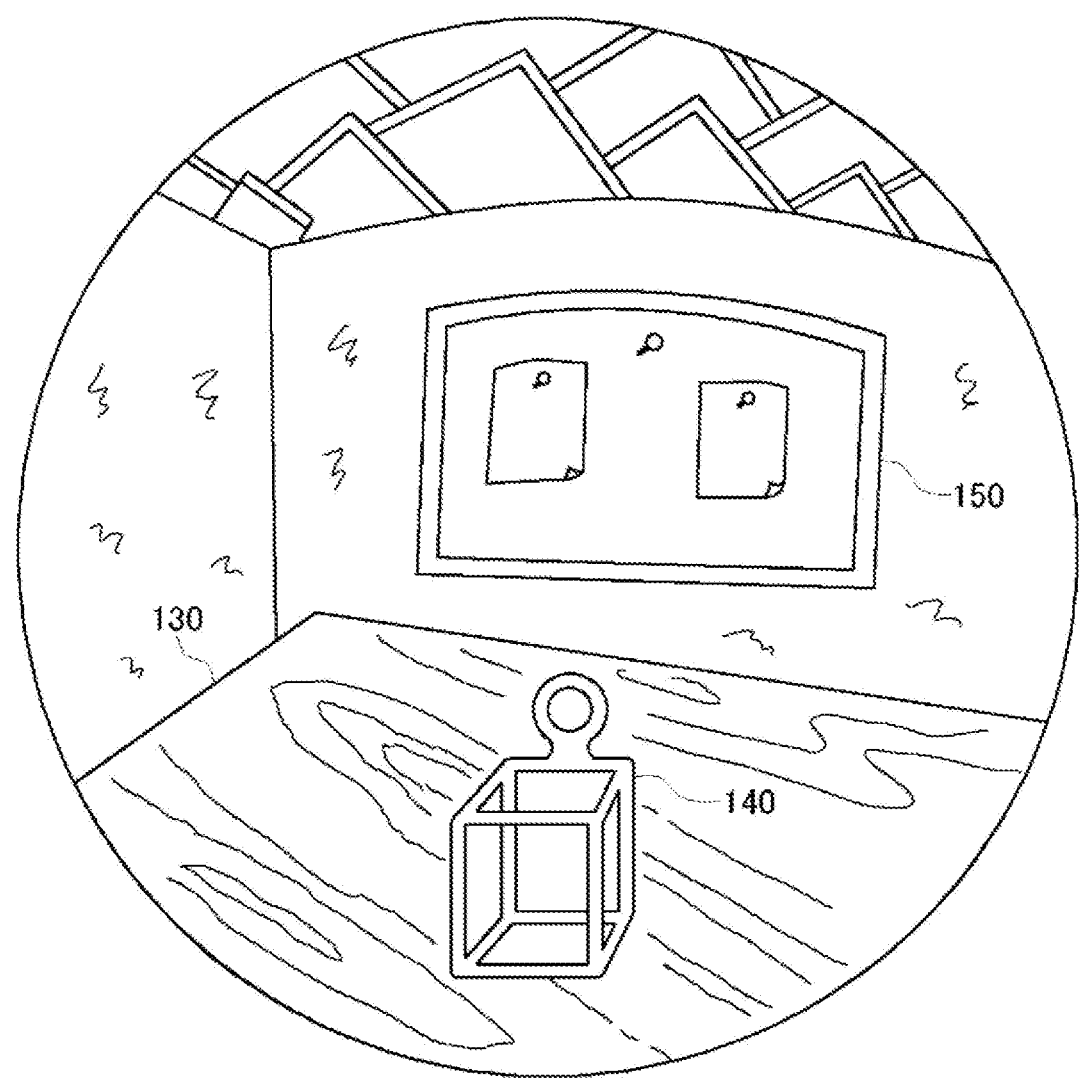
FIG. 9 is a view illustrating a stereovision image of a virtual object in a virtual space generated by the image processing apparatus according to the embodiment of the present invention.

FIG. 9 is a view illustrating a stereovision image of a virtual object in a virtual space generated by the image generation unit 25. A woodgrain texture is pasted to the surface of a desk 300, and a texture and virtual recesses and protrusions are formed also on the ceiling and the wall. The box 110 existing on the desk of FIG. 8 is replaced, in FIG. 9, with a virtual container 140 and arranged at the same position. The white board 120 hung on the wall in FIG. 8 is replaced, in FIG. 9, with a virtual bulletin board 150 and arranged at the same position.

In the case where a dynamic body enters the real space after the real space is spatially scanned to recognize a static body such as the floor, wall, ceiling or desk and the static bodies are replaced with virtual objects, the dynamic body entering later is not replaced with any virtual object, and therefore, the dynamic body having appeared suddenly is not displayed as it is in the virtual space. Therefore, in order to display the dynamic body in the virtual space, the captured image and the image of the virtual space are compared with each other in terms of the depth to decide a front-rear relation between them and a body in the captured image existing in front of the virtual object is superimposed in the virtual space.

In the case where a static body existing in the real space is replaced with a virtual object so as to be displayed, although the depth of the captured image and the depth of a stereovision image of the virtual object substantially coincide with each other. In terms of pixels, however, the body of the captured image is located in front or the virtual object is located in front in some cases, and the depth values conflict for each pixel. Therefore, if the depth value of the captured image is compared as it is with the depth value of the virtual object to make depth decision between them, then the depth relation is not displayed correctly. Therefore, in the case where the absolute value of the difference between depth values exceeds a predetermined threshold value, the depth comparison unit 22 decides that there is an unknown depth region at the location. Therefore, the image generation unit 25 can extract a dynamic body existing on the front side of the virtual object from the captured image and display the dynamic body in the virtual space without generating noise.

The depth of the virtual container 140 of FIG. 9 is substantially the same as the depth of the real box 110 of FIG. 8, and the depth of the virtual bulletin board 150 of FIG. 9 is substantially the same as the depth of the real white board 120 of FIG. 8. If the depth comparison unit 22 calculates the difference between the depth value of the object in the real space and the depth value of the virtual object, then the absolute value of the difference falls within the predetermined threshold value. Accordingly, a region in which a virtual object is to be rendered does not become an unknown depth region.

On the other hand, in the case where a dynamic body that does not appear in the captured image acquired by the image acquisition unit 21 enters the real space later, a substitute virtual object that is to replace such a dynamic body as just described is not determined in advance. Therefore, if the depth comparison unit 22 calculates, in regard to the region in which the dynamic body is actually imaged, the difference between the depth of the captured image and the depth of the virtual image, then the difference exceeds the predetermined threshold value, and therefore, the region becomes an unknown depth region.

Although the imaged region of a body entering the real space later becomes an unknown depth region in this manner, if nothing is displayed in the unknown depth region, then the user cannot notice the entering of the dynamic body and such an unexpected event that the user hits the dynamic body can occur. For example, in the case where a user wears and uses a display apparatus indoors, a dog or a person enters in some cases. In the case where a user wears and uses a display apparatus outdoors, a ball flies to the user in some cases. In such a case as just described, by displaying the presence of a dynamic body in the virtual space in some form such that the body having appeared suddenly in the virtual space is visually recognized by the user, it is possible to allow the user to take such an action as to avoid danger.

Figure 10:
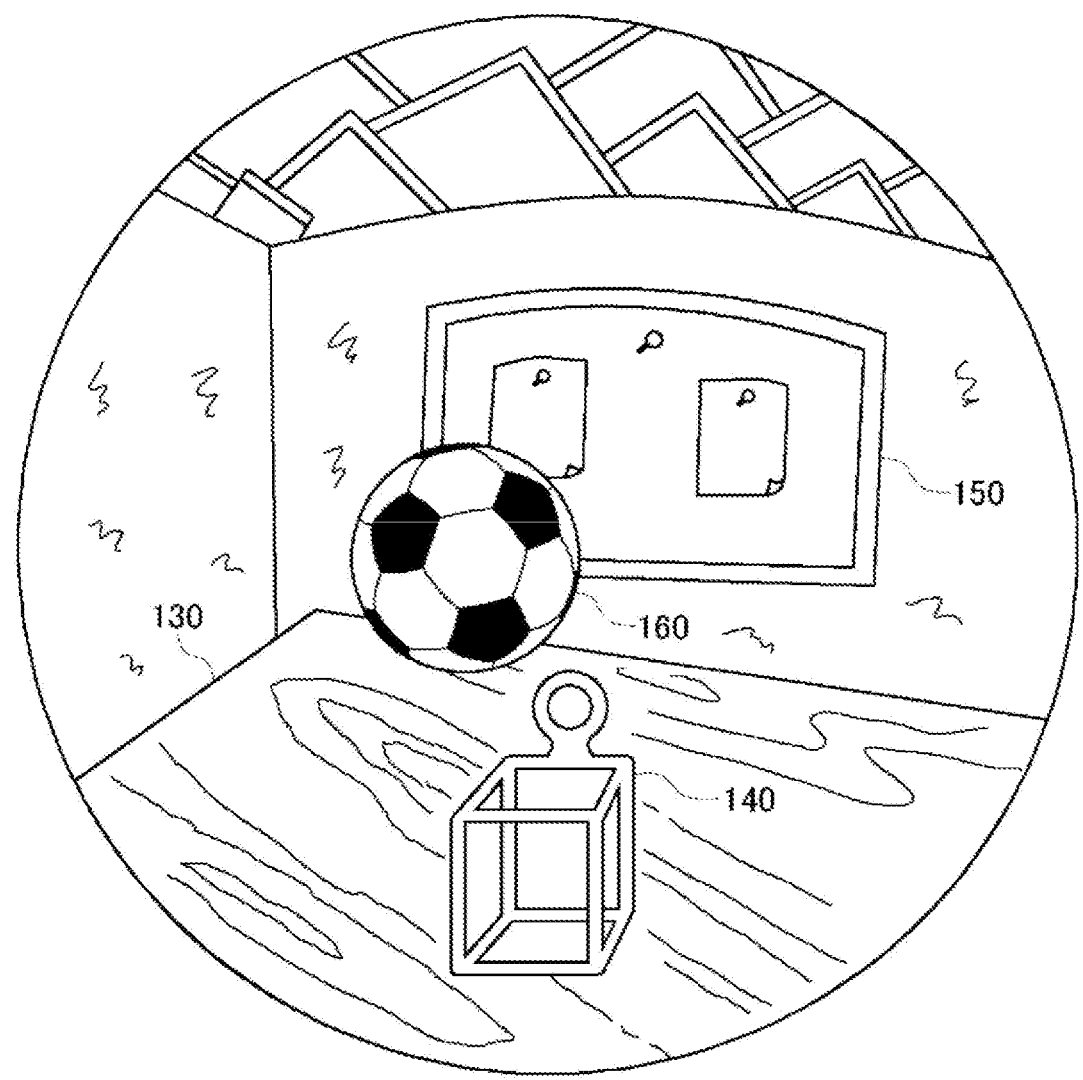
FIG. 10 is a view illustrating a stereovision image of the virtual object in the virtual space generated by the image processing apparatus according to the embodiment of the present invention in a case where a dynamic body enters a real space.

FIG. 10 is a view illustrating a stereovision image of a virtual object in the virtual space generated by the image generation unit 25 in the case where a dynamic body enters the real space. Here, a case is described in which a ball 160 as the dynamic body enters the real space later. In a region in which the ball 160 is actually imaged, the absolute value of the difference between the depth value of the captured image and the depth value of the virtual image exceeds the predetermined threshold value, and therefore, the region in which the ball 160 is actually imaged is decided as an unknown depth region. Here, the unknown depth processing unit 27 instructs the image generation unit 25 to display the actually captured image of the ball 160 in the unknown depth region. The image generation unit 25 superimposes the image of the ball 160 on the rendered image of the virtual space. A substitute virtual object may otherwise be rendered in the unknown depth region without using the actually captured image of the ball 160. For example, in the case where a dog enters the real space, a virtual dog or a different character may be rendered in the unknown depth region.

Figure 11:
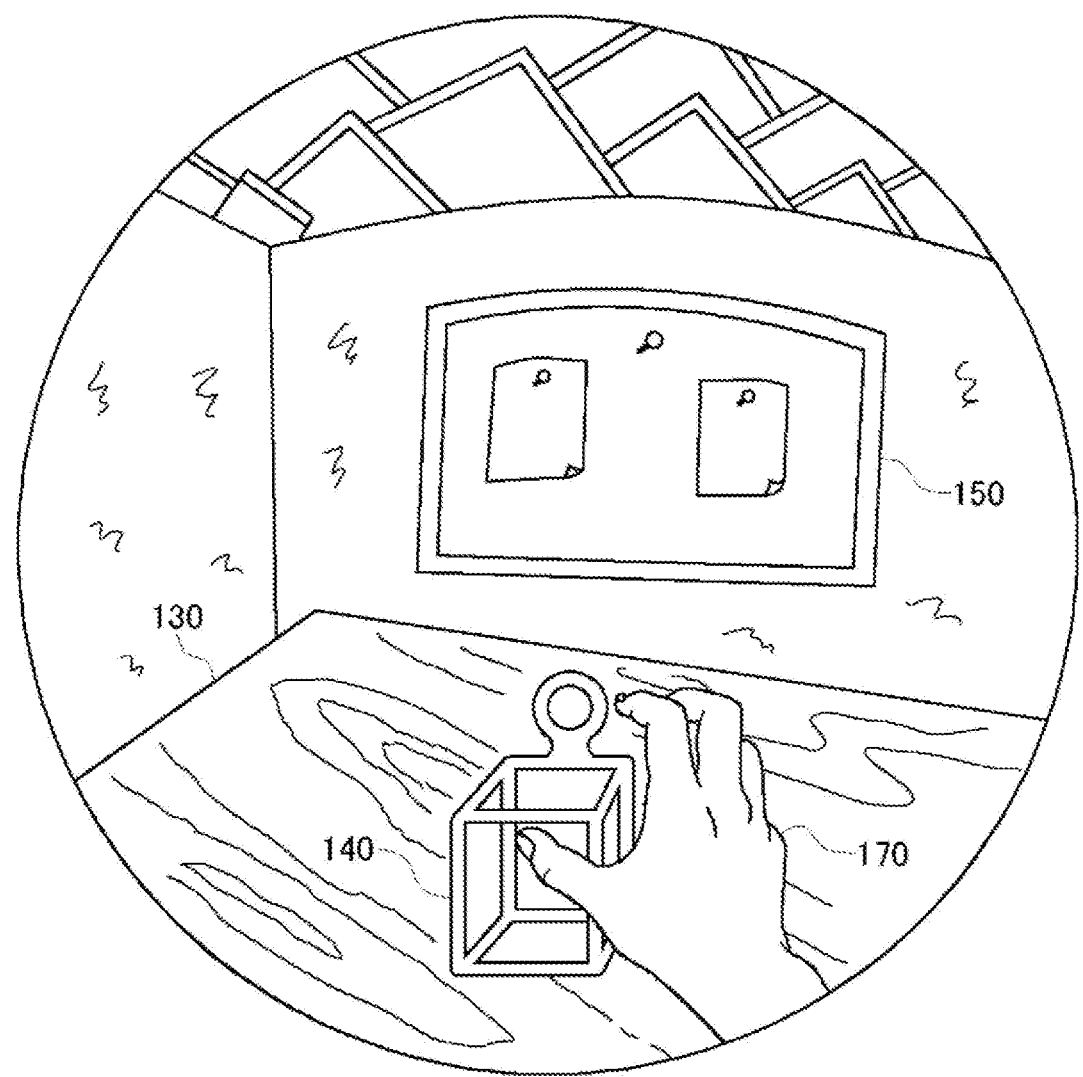
FIG. 11 is a view illustrating a stereovision image of the virtual object in the virtual space generated by the image processing apparatus according to the embodiment of the present invention in a case where the body of a user enters the real space.

FIG. 11 is a view illustrating a stereovision image of a virtual object in the virtual space generated by the image generation unit 25 in the case where a body part of the user enters the real space. Here, a case is described in which the user extends a hand and tries to grab the virtual container 140. Since a virtual object for replacement is not determined in advance for the hand 170 of the user that enters the real space later, in a region in which the hand 170 of the user is imaged, the absolute value of the difference between the depth value of the captured image and the depth value of the virtual image exceeds the predetermined threshold value. Thus, the region in which the hand 170 is actually imaged is decided as an unknown depth region. Here, the actually captured image of the hand 170 is superimposed on the unknown depth region. In place of the actually captured image of the hand 170, for example, a hand of a robot may be rendered in the unknown depth region as a substitute virtual object.

It may be decided whether or not, in the unknown depth region, an unknown object collides with an object in the real space (or a corresponding virtual object) such that, in the case where it is decided that the unknown object collides, some interaction is generated or such collision is utilized as an interface for the game. In the following, an interaction in an unknown depth region is described in detail.

Continuous unknown depth regions are cut out from a captured image and a collision region in which a space occupied by an unknown object is approximated by a cube or a sphere is generated. The collision region of the unknown object is converted from that in a camera space into that in the world space, and depth values are compared with each other to decide whether or not the collision region of the unknown object is brought into contact with a region occupied by an object in the real space, a corresponding virtual object, a body part of the user, or some other virtual object. This makes it possible to decide whether or not the unknown object collides with an object in the real space, a corresponding virtual object, a body part of the user, or some other virtual object. This collision decision is performed by the depth comparison unit 22.

In the case where it is decided that the unknown object collides with an object in the real space, a corresponding virtual object, a body part of the user, or some other virtual object, an interaction is caused to be generated according to the colliding object. Generation of a collision interaction is performed by the image generation unit 25 in accordance with an instruction of the unknown depth processing unit 27. As the collision interaction, the following examples are available.

(1) In the case where an unknown object collides with the wall of the real space (note that the wall in the real space is replaced with a wall in the virtual space)

An effect sound according to the material of the wall in the virtual space is generated.

An effect representing collision is displayed at the place of the collision.

A scratch is formed on or a hole is formed in the wall in the virtual space.

Simulation of targeting in which part of the wall in the real space is used as a target is performed such that a video effect such as in block breaking is displayed in a video of the augmented reality.

(2) In the case where an unknown object collides with the body of a user

An effect sound is generated or an effect is superimposed on a video of a collided part of the body. The effect sound or a pattern of the effect may be changed depending upon the collided body part.

While the unknown object remains in contact with the body of the user, the color or the appearance of a substitute virtual object corresponding to the unknown object is changed. The color or the appearance may be changed depending upon the user who has touched the unknown object last.

While the user holds the unknown object, energy is accumulated in a substitute virtual object corresponding to the unknown object and, for example, the shape, size, color or the like thereof changes.

(3) In the case where the unknown object collides with another virtual object

The physical phenomenon of collision is reflected such that the position of the virtual object is changed.

A virtual object (for example, an enemy character) is damaged or an effect is superimposed to erase the virtual object.

Defense is made against an attack from a virtual object (for example, an enemy character).

Items floating in the air are collected.

A monster is confined in a substitute virtual object (for example, a ball) corresponding to the unknown object.

Further, if the difference is calculated between frames of an unknown depth region cut out from a captured image, then it can be decided whether or not unknown depth regions that indicate a movement between the frames are of the same object. In the case where the difference between frames of an unknown depth region is great, it is considered that the same unknown object does not move but a new unknown object has appeared. Further, a moving speed of an unknown object can be estimated from the difference between frames of an unknown depth region, and anticipating collision decision becomes possible.

Also it is possible to estimate, from a change in feature point of a captured image overlapping with a cut out unknown depth region, a posture difference (speed and angular speed) between frames of an unknown object. In the case where a camera is disposed in a head-mounted display, the posture difference between frames of an unknown object is estimated taking the posture of the head-mounted display into consideration.

It is to be noted that, in the case where an unknown object goes out of an angle of view of a camera, it is possible to predict a motion or collision of the unknown object for a while using speed information at a point of time at which the unknown object has been observed last.

The present invention has been described on the basis of the embodiment. The embodiment is exemplary and it is recognized by those skilled in the art that various modifications can be made to combinations of the components and/or the processes in the embodiment and that also such modifications fall within the scope of the present invention.

Although the foregoing description is given taking a display apparatus of the video transmission (video see-through) type as an example, the present embodiment can be applied also to a case of a display apparatus of an optical transmission (optical see-through) type in which a display unit includes a half mirror and a user is allowed to view a real space in front of the eyes. In the case of the display apparatus of the optical transmission type, comparison between depth information of a real space and depth information of an image of a virtual space is performed and, in a region in which a body of the real space exists in front of a virtual object, the image of the virtual space is deleted such that a user is allowed to visually recognize the body of the real space in a see-through manner. For the comparison of depth information, the method of comparing an absolute value of a difference between depth values with a predetermined threshold value described hereinabove in connection with the depth comparison unit 22 in the present embodiment is used, so that an unknown depth region is decided. Then, a see-through view is provided in the unknown depth region without displaying the image of the virtual space, so that the user is allowed to see a dynamic body in the real space that has suddenly entered in front of the virtual object in a see-through manner.

REFERENCE SIGNS LIST

10 Image processing apparatus, 11 Control unit, 12 Storage unit, 13 Interface unit, 20 Operation device, 21 Image acquisition unit, 22 Depth comparison unit, 23 Virtual space configuration unit, 24 Rendering camera setting unit, 25 Image generation unit, 26 Output unit, 27 Unknown depth processing unit, 30 Relay apparatus, 40 Display apparatus, 41 Video display element, 42 Optical element, 43 Camera, 44 Sensor, 45 Communication interface, 51 Image processing unit, 52 Application executing unit, 430 Imaging element, 441 Head direction sensor

INDUSTRIAL APPLICABILITY

This invention can be used in an image processing technology.

The invention claimed is:

1. An image processing apparatus comprising:
a virtual space configuration unit configured to detect, on a basis of depth information of an image of a real space around a user, a position of an object in the real space and arrange a virtual body at a position in a virtual space corresponding to the detected position of the object to configure information of the virtual space;
an image generation unit configured to generate an image of the virtual space configured by the virtual space configuration unit; and
a depth comparison unit configured to compare the depth information of the image of the real space and depth information of the image of the virtual space to decide an unknown depth region,
wherein the image generation unit displays information indicative of presence of an unknown object in the unknown depth region of the image of the virtual space.

2. The image processing apparatus according to claim 1, wherein the depth comparison unit calculates a difference between a depth value of the image of the real space and a depth value of the image of the virtual space in a unit of a pixel and decides a region of a pixel in regard to which an absolute value of the difference exceeds a predetermined threshold value as the unknown depth region.

3. The image processing apparatus according to claim 1, wherein the image generation unit superimposes on the unknown depth region an image of a body actually captured in the unknown depth region of the image of the real space or an image of a virtual object that substitutes for the body as the information indicative of the presence of the unknown object.

4. The image processing apparatus according to claim 1, wherein the image generation unit adds a video effect to the unknown depth region as the information indicative of the presence of the unknown object.

5. The image processing apparatus according to claim 1, wherein the image generation unit deletes, in regard to the unknown depth region of the image of the virtual space, the image of the virtual space in order to allow the real space to be seen in a see-through manner.

6. The image processing apparatus according to claim 1, wherein the depth comparison unit decides whether or not the unknown object collides with an object in the real space or a corresponding virtual body in the unknown depth region, and
the image generation unit generates an interaction in the virtual space in a case where it is decided that the unknown object collides with the object in the real space or the corresponding virtual body in the unknown depth region.

7. An image processing method comprising:
a virtual space configuration step of detecting, on a basis of depth information of an image of a real space around a user, a position of an object in the real space and arrange a virtual body at a position in a virtual space corresponding to the detected position of the object to configure information of the virtual space;
an image generation step of generating an image of the virtual space configured by the virtual space configuration step; and
a depth comparison step of comparing the depth information of the image of the real space and depth information of the image of the virtual space to decide an unknown depth region,
wherein the image generation step displays information indicative of presence of an unknown object in the unknown depth region of the image of the virtual space.

8. A non-transitory computer readable medium having stored thereon a program, the program causing a computer to implement:
a virtual space configuration function for detecting, on a basis of depth information of an image of a real space around a user, a position of an object in the real space and arrange a virtual body at a position in a virtual space corresponding to the detected position of the object to configure information of the virtual space;
an image generation function for generating an image of the virtual space configured by the virtual space configuration function; and
a depth comparison function for comparing the depth information of the image of the real space and depth information of the image of the virtual space to decide an unknown depth region,
wherein the image generation function displays information indicative of presence of an unknown object in the unknown depth region of the image of the virtual space.

* * * * *